US011346556B2

(12) United States Patent
Nakao et al.

(10) Patent No.: US 11,346,556 B2
(45) Date of Patent: May 31, 2022

(54) COMBUSTOR HAVING INNER AND OUTER TUBULAR OXYGEN NOZZLES ABOUT A TUBULAR FUEL SUPPLY UNIT

(71) Applicant: MITSUBISHI HEAVY INDUSTRIES, LTD., Tokyo (JP)

(72) Inventors: Mitsuhiro Nakao, Tokyo (JP); Satoshi Takiguchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 130 days.

(21) Appl. No.: 16/980,904

(22) PCT Filed: Mar. 18, 2019

(86) PCT No.: PCT/JP2019/011252
§ 371 (c)(1),
(2) Date: Sep. 15, 2020

(87) PCT Pub. No.: WO2019/181877
PCT Pub. Date: Sep. 26, 2019

(65) Prior Publication Data
US 2021/0025323 A1  Jan. 28, 2021

(30) Foreign Application Priority Data
Mar. 20, 2018  (JP) .............................. JP2018-053512

(51) Int. Cl.
*F23R 3/34*  (2006.01)
*F02C 3/30*  (2006.01)
(Continued)

(52) U.S. Cl.
CPC .................. *F23R 3/20* (2013.01); *F02C 3/30* (2013.01); *F23R 3/26* (2013.01); *F23R 3/346* (2013.01);
(Continued)

(58) Field of Classification Search
CPC .... F23R 3/20; F23R 3/26; F23R 3/286; F23R 3/343; F23R 3/346; F02C 3/22; F02C 3/30
See application file for complete search history.

(56) References Cited

U.S. PATENT DOCUMENTS 9,835,089 B2 *  12/2017  Zuo ........................... F02C 7/22
2002/0192615 A1  12/2002  Moriya et al.
(Continued)

FOREIGN PATENT DOCUMENTS

JP    2007-262951 A    10/2007
JP    2008-249187 A    10/2008
(Continued)

OTHER PUBLICATIONS

International Search Report dated Jun. 4, 2019, issued in counterpart Application No. PCT/JP2019/011252, with English translation (3 pages).
(Continued)

*Primary Examiner* — William H Rodriguez
(74) *Attorney, Agent, or Firm* — WHDA, LLP (57) ABSTRACT

A combustor includes a fuel supply unit defining on a radially inner side of an axis an inner peripheral side space into which inert gas is introduced and which is configured to supply the inert gas to a combustion cylinder, and defining on a radially outer side an outer peripheral side space into which the inert gas is introduced and which is configured to supply the inert gas to the combustion cylinder; an inner peripheral side oxygen supply unit that is configured to supply oxygen to the inner peripheral side space; an outer peripheral side oxygen supply unit that is configured to supply oxygen to the outer peripheral side space; and an adjustment unit that is configured to adjust the relative amounts of the oxygen supplied by the inner peripheral side oxygen supply unit and the oxygen supplied by the outer peripheral side oxygen supply unit.

5 Claims, 7 Drawing Sheets

(51) Int. Cl.
    *F23R 3/26* (2006.01)
    *F23R 3/20* (2006.01)
    *F02C 3/22* (2006.01)
    *F23R 3/28* (2006.01)

(52) U.S. Cl.
    CPC ................ *F02C 3/22* (2013.01); *F23R 3/286* (2013.01); *F23R 3/343* (2013.01)

(56) References Cited

U.S. PATENT DOCUMENTS

| | | | | |
|---|---|---|---|---|
| 2003/0110774 A1* | 6/2003 | Saitoh | ............... | F23R 3/14 60/737 |
| 2013/0139511 A1* | 6/2013 | Sometani | ............... | F23R 3/343 60/722 |
| 2014/0123672 A1 | 5/2014 | Huntington et al. | | |
| 2016/0273776 A1* | 9/2016 | Takiguchi | ............... | F23R 3/14 |
| 2019/0360697 A1* | 11/2019 | Tada | ............... | F23R 3/286 |
| 2020/0208575 A1* | 7/2020 | Matsumura | ............... | F23R 3/04 |

FOREIGN PATENT DOCUMENTS

| JP | 2011-094573 A | 5/2011 |
|---|---|---|
| JP | 2013-053844 A | 3/2013 |
| JP | 2016-505101 A | 2/2016 |

OTHER PUBLICATIONS

Written Opinion dated Jun. 4, 2020, issued in counterpart Application No. PCT/JP2019/011252, with English Translation (10 pages).
Written Opinion dated Jun. 4, 2019, issued in counterpart Application No. PCT/JP2019/011252, with English Translation (10 pages).

* cited by examiner

COMBUSTOR HAVING INNER AND OUTER TUBULAR OXYGEN NOZZLES ABOUT A TUBULAR FUEL SUPPLY UNIT

TECHNICAL FIELD

The present invention relates to a combustor.
Priority is claimed on Japanese Patent Application No. 2018-053512, filed Mar. 20, 2018, the content of which is incorporated herein by reference.

BACKGROUND ART

For example, gas turbines are composed of a compressor, a combustor, and a turbine. The gas turbines compress air with the compressor to produce high-temperature and high-pressure compressed air. In the combustor, fuel is supplied to the compressed air and combusted, and the turbine is driven by the high-temperature and high-pressure combustion gas. Additionally, in the gas turbines, it is possible to drive a generator coupled to the turbine to generate power.

Additionally, there are also combined power generation systems in which a gasification furnace is applied to such gas turbines. In the combined power generation system, a solid fuel or a liquid fuel is gasified in the gasification furnace, and the generated gas is sent as a fuel to a gas turbine and combusted. The generated combustion gas drives the turbine to generate power. Additionally, a high-temperature emission gas discharged from the gas turbine is sent to the boiler to generate steam, and the steam turbine is driven by the generated steam to generate power.

Meanwhile, in the above-described combined power generation systems, the emission gas discharged from the gas turbine contains carbon dioxide ($CO_2$).

Patent Document 1 describes a combined power generation system in which a gasification furnace and a closed gas turbine that mixes an emission gas with gas fuel and oxygen to combust the mixed gas are combined with each other. In the combined power generation system, oxygen is mixed in the emission circulation gas discharged from the compressor and combusted in a combustor. Additionally, in the combined power generation system, oxygen is input immediately before a combustion region in consideration of the safety and pressure loss of the combustor.

CITATION LIST

Patent Literature

[Patent Document 1]
Japanese Unexamined Patent Application, First Publication No. 2011-94573

SUMMARY OF INVENTION

Technical Problem

Patent Document 1 describes the combustor that supplies oxygen adjacent to both a radially inner side and a radially outer side of the gas fuel. The combustor promotes the mixing of the gas fuel and oxygen to realize efficient combustion.

Meanwhile, in the field of combustors, there is a demand for further improving the combustion state.

The present invention provides a combustor capable of further improving a combustion state.

Solution to Problem

According to a first aspect of the present invention, a combustor includes a combustion cylinder having a tubular shape centered on an axis; a fuel supply unit that has a tubular shape centered on the axis and is configured to inject fuel from an upstream side with respect to the combustion cylinder, the fuel supply unit defining an inner peripheral side space into which an inert gas is introduced on a radially outer side of the axis and which is configured to supply the inert gas to the combustion cylinder and defining an outer peripheral side space into which the inert gas is introduced on a radially outer side around the axis and which is configured to supply the inert gas to the combustion cylinder; an inner peripheral side oxygen supply unit that is configured to supply oxygen to the inner peripheral side space; an outer peripheral side oxygen supply unit that is configured to supply oxygen to the outer peripheral side space; and an adjustment unit that is configured to adjust relative amounts of the oxygen supplied by the inner peripheral side oxygen supply unit and the oxygen supplied by the outer peripheral side oxygen supply unit.

According to such a configuration, by adjusting the relative amounts of the oxygen supplied to the inner peripheral side space and the oxygen supplied to the outer peripheral side space, it is possible to bring the oxygen concentration closer to a more suitable oxygen concentration in accordance with the combustion state of the fuel. Accordingly, the CO concentration of the combustion gas can be reduced.

In the above combustor, the adjustment unit may individually adjust a supply amount of the oxygen supplied from the inner peripheral side oxygen supply unit and a supply amount of the oxygen supplied from the outer peripheral side oxygen supply unit.

According to such a configuration, the optimal oxygen concentration can be set according to the combustion state of the fuel.

In the above combustor, the inner peripheral side oxygen supply unit may have a tubular inner peripheral side nozzle that extends in an axial direction, and a plurality of inner peripheral oxygen injection holes disposed at a tip of the inner peripheral side nozzle, and the plurality of inner peripheral oxygen injection holes may be disposed as close to the radially outer side as possible, and the outer peripheral side oxygen supply unit may have a tubular outer peripheral side nozzle that extends in the axial direction, and a plurality of outer peripheral oxygen injection holes disposed at a tip of the outer peripheral side nozzle, and the plurality of outer peripheral oxygen injection holes may be disposed as close to the radially inner side as possible.

According to such a configuration, since the oxygen concentration on the fuel supply unit side increases, the combustion of fuel is promoted, and the CO concentration of the combustion gas can be further reduced.

In the above combustor, the inner peripheral side oxygen supply unit may have a tubular inner peripheral side nozzle that extends in an axial direction, and a plurality of inner peripheral oxygen injection holes disposed at a tip of the inner peripheral side nozzle, the outer peripheral side oxygen supply unit may have a tubular outer peripheral side nozzle that extends in the axial direction, and a plurality of outer peripheral oxygen injection holes disposed at a tip of the outer peripheral side nozzle, and positions of the plurality of inner peripheral oxygen injection hole in the axial direction may be different from positions of the plurality of outer peripheral oxygen injection holes in the axial direction.

In the above combustor, the positions of the plurality of inner peripheral oxygen injection holes in the axial direction may be disposed downstream with respect to the positions of the plurality of outer peripheral oxygen injection holes in the axial direction.

According to such a configuration, the combustibility of the fuel and oxygen is activated on the inner peripheral side to improve the flame holding property, and the flame temperature is suppressed on the outer peripheral side. For that reason, a temperature rise on the wall surface side of the combustion cylinder can be suppressed.

In the above-mentioned combustor, the combustor may further include a CO concentration measurement device that is configured to measure a CO concentration of a combustion gas flowing in the combustion cylinder, the adjustment unit may increase a supply amount of the oxygen by the inner peripheral side oxygen supply unit and decrease a supply amount of the oxygen by the outer peripheral side oxygen supply unit in a case where a CO concentration at a central portion in the combustion cylinder is higher than a CO concentration on the radially outer side in the combustion cylinder and may decrease the supply amount of the oxygen of the inner peripheral side oxygen supply unit and increase the supply amount of the oxygen of the outer peripheral side oxygen supply unit in a case where the CO concentration at the central portion in the combustion cylinder is lower than the CO concentration on the radially outer side in the combustion cylinder.

Advantageous Effects of Invention

According to the present invention, by adjusting the relative amounts of the oxygen supplied to the inner peripheral side space and the oxygen supplied to the outer peripheral side space, it is possible to bring the oxygen concentration closer to a more suitable oxygen concentration in accordance with the combustion state of the fuel. Accordingly, the CO concentration of the combustion gas can be reduced.

DESCRIPTION OF EMBODIMENTS

First Embodiment

Hereinafter, a combustor of a first embodiment of the present invention will be described in detail with reference to the drawings.

Figure 1:
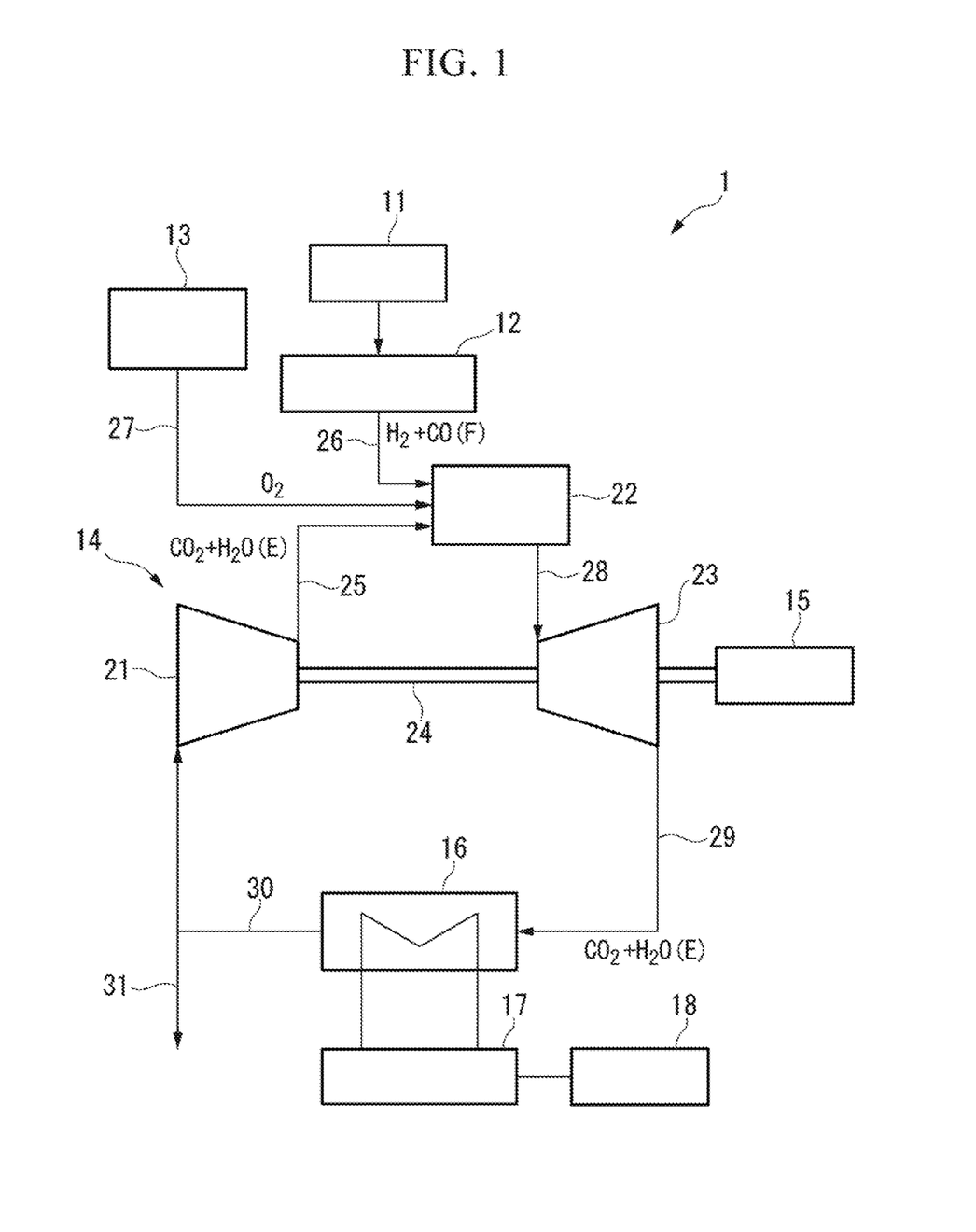
FIG. 1 is a schematic diagram of a power generation system according to a first embodiment of the present invention.

As illustrated in FIG. 1, a power generation system 1 of the present embodiment is a combined power generation system including a gasification furnace 11, a gas purification apparatus 12, an oxygen production apparatus 13, a gas turbine 14 including a combustor 22, a first generator 15 that generates power by a driving force of the gas turbine 14, a waste heat recovery boiler 16 (HRSG), a steam turbine 17, and a second generator 18.

The gasification furnace 11 incompletely combusts pulverized coal (coal) as a solid fuel to generate unburned gas ($H_2$, CO, $CO_2$, $N_2$, and the like). The gas purification apparatus 12 performs purification treatment or the like from the unburned gas generated in the gasification furnace 11, thereby removing impurities to purify the gas fuel F($H_2$, CO). That is, by passing the unburned gas generated in the gasification furnace 11 through various devices of the gas purification apparatus 12, it is possible to remove sulfur compounds, nitrogen compounds, and other harmful substances by its own heat. The gasification furnace 11 may be configured to gasify liquid fuel.

The oxygen production apparatus 13 produces high-concentration pure oxygen from the atmosphere. As the oxygen production apparatus 13 is, it is possible to adopt, for example, apparatuses using techniques such as a cryogenic fractional distillation method (liquefaction fractional distillation method), a pressure sweep adsorption (PSA) method using a zeolite adsorbent, and a pressure sweep adsorption (PSA) method using a carbon molecular sieve.

The gas turbine 14 has a compressor 21, the combustor 22, and a turbine 23. The compressor 21 and the turbine 23 are coupled to each other via a turbine shaft 24. The gas turbine 14 and the first generator 15 are coupled to each other via the turbine shaft 24.

The compressor 21 and the combustor 22 of the gas turbine 14 are connected to each other by an emission circulation gas supply line 25.

The combustor 22 and the gas purification apparatus 12 are connected to each other by a gas fuel supply line 26.

The combustor 22 and the oxygen production apparatus 13 are connected to each other by an oxygen supply line 27. The combustor 22 and the turbine 23 are connected to each other by a combustion gas supply line 28.

The waste heat recovery boiler 16 has, for example, a high-pressure boiler, a medium-pressure boiler, and a low-pressure boiler. The waste heat recovery boiler 16 can generate steam in each boiler by the emission gas discharged from the gas turbine 14.

The turbine 23 and the waste heat recovery boiler 16 are connected to each other by an emission gas discharge line 29. The emission gas E ($CO_2+H_2O$) discharged from the turbine 23 is introduced into the emission gas discharge line 29. The waste heat recovery boiler 16 and the compressor 21 of the gas turbine 14 are connected to each other by an emission gas return line 30. An emission gas recovery line 31 branches from the emission gas return line 30.

The steam turbine 17 can be driven by being supplied with the steam generated in the waste heat recovery boiler 16 to operate the coupled second generator 18. The steam supplied to the steam turbine 17 is sent to a condenser (not illustrated) to be condensed and then sent to the waste heat recovery boiler 16 by a condensate pump. In addition, in this case, the gas turbine 14 and the steam turbine 17 may be coaxially disposed to share one generator.

The emission circulation gas supply line 25, the combustion gas supply line 28, the emission gas discharge line 29, and the emission gas return line 30 constitute a circulation path for the emission gas E. In addition, in the following description, the gas discharged from the turbine 23 is referred to as an emission gas E. Additionally, the gas compressed in the compressor 21 and supplied to the combustor 22 by the emission circulation gas supply line 25 is referred to as an emission circulation gas E. The emission gas E and the emission circulation gas E have different temperatures and pressures but are of the same quality. The emission gas E and the emission circulation gas E function as inert gases.

Next, the operation of the power generation system 1 of the present embodiment will be described.

In the gasification furnace 11, oxygen, nitrogen, and pulverized coal are supplied, and the pulverized coal is combusted inside to generate unburned gas. The unburned gas is cooled in a heat exchanger and then char is removed therefrom. Then, the gas purification apparatus 12 purifies the gas fuel F by removing sulfur compounds, nitrogen compounds, and other harmful substances.

In the gas turbine 14, the emission gas E taken into the compressor 21 through the emission gas return line 30 is compressed to be a high-temperature and high-pressure compressed gas (emission circulation gas E). The compressed gas is sent to the combustor 22 via the emission circulation gas supply line 25 as the emission circulation gas E. The gas fuel F purified in the gas purification apparatus 12 is sent to the combustor 22 via the gas fuel supply line 26, and the oxygen ($O_2$) produced in the oxygen production apparatus 13 is sent to the combustor 22 through the oxygen supply line 27.

In the combustor 22, the mixed gas of the emission circulation gas E, the gas fuel F, and oxygen is ignited and combusted. The high-temperature and high-pressure combustion gas generated in the combustor 22 is sent to the turbine 23 via the combustion gas supply line 28 and passes through a plurality of stationary blades and moving blades (not illustrated) to rotationally drive the turbine shaft 24. Accordingly, the first generator 15 operates to generate power.

The emission gas E discharged from the turbine 23 is sent to the waste heat recovery boiler 16 via the emission gas discharge line 29. In the waste heat recovery boiler 16, steam is generated by the high-temperature and high-pressure emission gas E. The generated steam is sent to the steam turbine 17 to drive the steam turbine 17, and thereby, the second generator 18 is operated to generate power. The emission gas heat-recovered by the waste heat recovery boiler 16 is returned to the compressor 21 via the emission gas return line 30, and a part thereof is recovered through the emission gas recovery line 31.

In the power generation system 1 of the present embodiment configured in this way, the emission circulation gas E, the gas fuel F, and oxygen are supplied to the combustor 22 and combusted. For that reason, it is necessary to sufficiently mix the gas fuel F and oxygen to efficiently combust the mixed gas.

Figure 2:
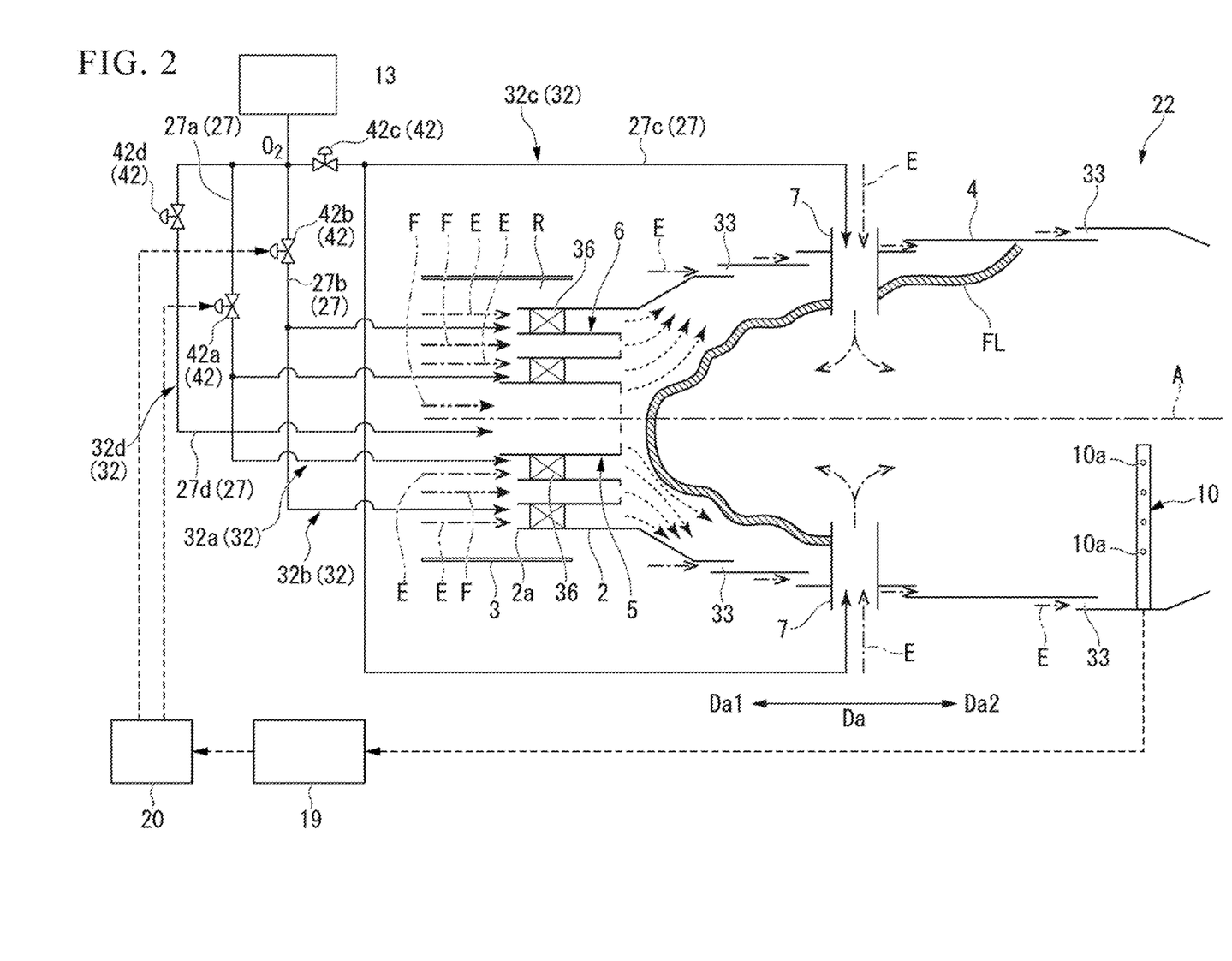
FIG. 2 is a schematic diagram of a combustor according to the first embodiment of the present invention.

As illustrated in FIG. 2, the combustor 22 includes an inner cylinder 2, an outer cylinder 3, a combustion cylinder 4, a pilot nozzle 5, a main nozzle 6 (fuel supply unit), a scoop 7, a plurality of oxygen supply units. 32, a CO concentration measurement device 10, an analysis unit 19, and an adjustment unit 20. The inner cylinder 2 has a tubular shape centered on an axis A. The outer cylinder 3 is provided coaxially with the axis A of the inner cylinder 2 on an outer peripheral side of the inner cylinder 2. The combustion cylinder 4 is connected to a downstream side Da2 of the inner cylinder 2 and further extends to the downstream side Da2. The pilot nozzle 5 and the main nozzle 6 (fuel supply unit) are disposed within the inner cylinder 2. The scoop 7 is formed so as to penetrate the combustion cylinder 4. The plurality of oxygen supply units 32 supply oxygen into the combustion cylinder 4. The CO concentration measurement device 10g measures the CO concentration of the combustion gas flowing through the combustion cylinder 4. The analysis unit 19 analyzes the CO concentration measured by the CO concentration measurement device 10. The adjustment unit 20 adjusts the supply amount of the oxygen supplied to the oxygen supply unit 32 on the basis of the result analyzed by the analysis unit 19.

In addition, in the following description, a direction in which the axis A of the inner cylinder 2 extends is referred to as an axial direction Da. Additionally, a direction orthogonal to the axis A is referred to a radial direction. A side away from the axis A in this radial direction is referred to as a radially outer side. A side closer to the axis A in this radial direction is referred to as a radially inner side. Additionally, in the axial direction Da, a left side of FIGS. 2 and 3 is referred to as an upstream side Da1, and the right side of FIGS. 2 and 3 is referred to as the downstream side Da2.

Figure 3:
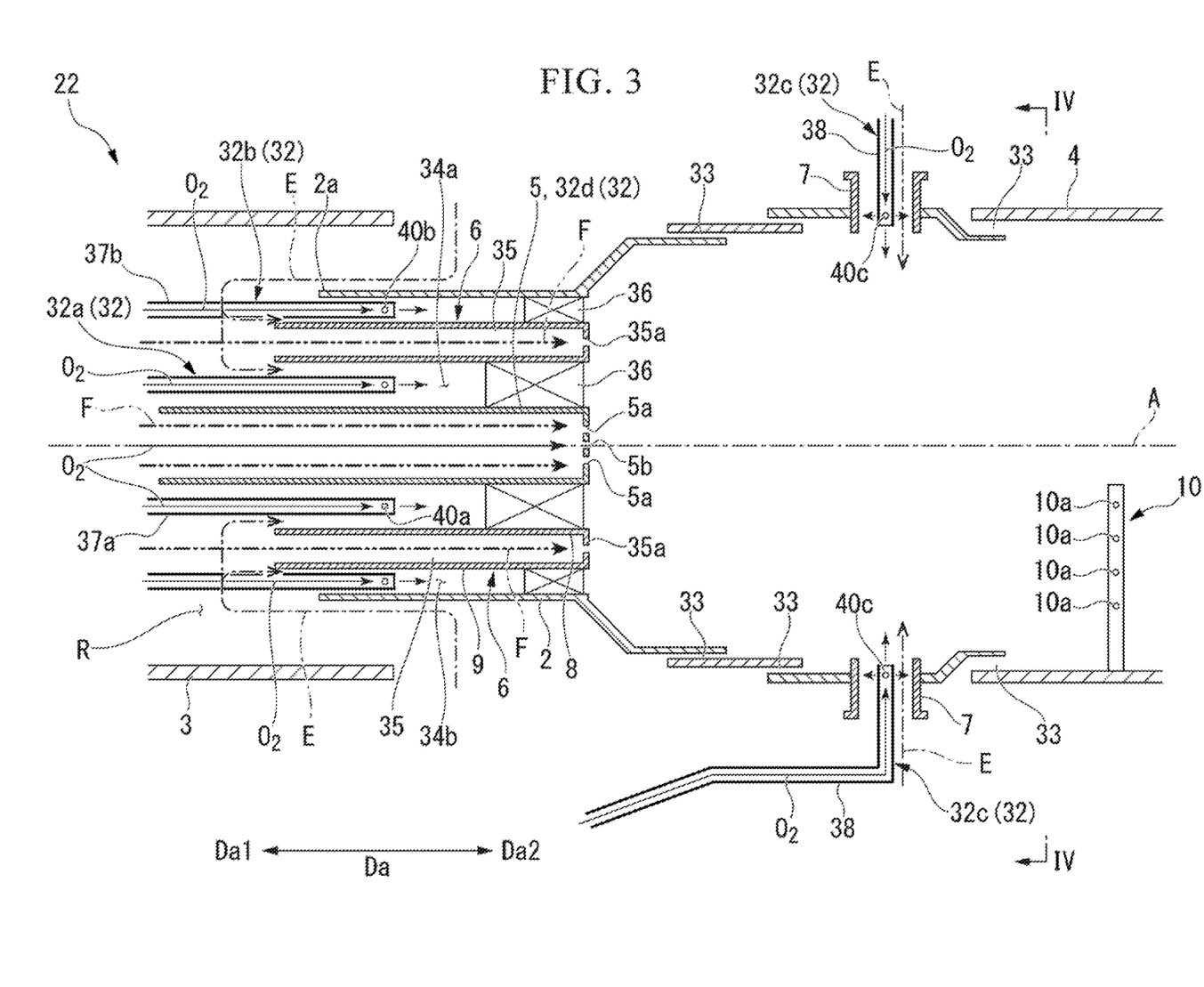
FIG. 3 is a detailed view of the combustor of the first embodiment of the present invention.

Additionally, in FIGS. 2 and 3, oxygen is indicated by a solid arrow, the emission circulation gas E is indicated by a dashed-dotted arrow, and the gas fuel F is indicated by a double-dashed arrow.

An emission circulation gas flow path R for introducing the emission circulation gas E so as to be reversed at an end portion 2a of the inner cylinder 2 and directed to the downstream side Da2 is formed between the outer cylinder 3 and the inner cylinder 2. That is, the emission circulation gas E is introduced into the emission circulation gas flow path R via the emission circulation gas supply line 25.

The emission circulation gas E that has flowed into the combustor 22 from between the outer cylinder 3 and the combustion cylinder 4 turns 180° at an end wall of the outer cylinder 3 (not illustrated) and is supplied to the inside of the inner cylinder 2 (main nozzle 6).

The combustion cylinder 4 has a tubular shape centered on the axis A and has a plurality of openings 33 that allows the emission circulation gas E to flow to the downstream side Da2 therethrough. The emission circulation gas E flowing from the opening 33 functions as a film fluid.

The scoop 7 is a tubular member that penetrates an outer peripheral surface of the combustion cylinder 4 from the radially outer side toward a center portion of the combustion cylinder 4. Four scoops 7 are provided at equal intervals in the circumferential direction. The number of scoops 7 is not limited to this and may be, for example, eight.

The pilot nozzle 5 is provided along the axis A of the inner cylinder 2 on the upstream side Da1 of the combustion cylinder 4. The pilot nozzle 5 injects the gas fuel F supplied from the gas purification apparatus 12 from a tip side to the downstream side Da2 and ignites the gas fuel F to generate a flame. That is, a part of the gas fuel F introduced into the combustor 22 via the gas fuel supply line 26 is supplied to the pilot nozzle 5.

The main nozzle 6 is a ring-shaped nozzle that is provided radially inside the inner cylinder 2 and radially outside the pilot nozzle 5 and is coaxial with the inner cylinder 2.

The combustor 22 has four systems of oxygen supply units 32: an inner peripheral side oxygen supply unit 32a, an outer peripheral side oxygen supply unit 32b, a scoop oxygen supply unit 32c, and a pilot nozzle oxygen supply unit 32d. The inner peripheral side oxygen supply unit 32a supplies oxygen to the radially inner side with respect to the main nozzle 6. The outer peripheral side oxygen supply unit 32b supplies oxygen to a portion radially outside the main nozzle 6. The scoop oxygen supply unit 32*c* supplies oxygen to the scoop 7. The pilot nozzle oxygen supply unit 32*d* supplies oxygen to the pilot nozzle 5. The oxygen supply line 27 into which oxygen is introduced from the oxygen production apparatus 13 is branched into four.

The inner peripheral side oxygen supply unit 32*a* has an inner peripheral side nozzle 37*a* (refer to FIG. 3) connected to a first oxygen supply line 27*a*.

The outer peripheral side oxygen supply unit 32*b* has an outer peripheral side nozzle 37*b* (refer to FIG. 3) connected to a second oxygen supply line 27*b*.

The scoop oxygen supply unit 32*c* has a scoop nozzle 38 (refer to FIG. 3) connected to a third oxygen supply line 27*c*.

The pilot nozzle oxygen supply unit 32*d* has the pilot nozzle 5 connected to a fourth oxygen supply line 27*d*. That is, the pilot nozzle 5 functions as the oxygen supply unit 32.

The first oxygen supply line 27*a* is provided with a first adjustment valve 42*a* that adjusts the flow rate of oxygen flowing through the first oxygen supply line 27*a*.

The second oxygen supply line 27*b* is provided with a second adjustment valve 42*b* that adjusts the flow rate of oxygen flowing through the second oxygen supply line 27*b*.

The third oxygen supply line 27*c* is provided with a third adjustment valve 42*c* that adjusts the flow rate of oxygen flowing through the third oxygen supply line 27*c*.

The fourth oxygen supply line 27*d* is provided with a fourth adjustment valve 42*d* that adjusts the flow rate of oxygen flowing through the fourth oxygen supply line 27*d*.

The gas fuel F supplied from the gas purification apparatus 12 is introduced into the pilot nozzle 5 and the main nozzle 6.

The emission circulation gas E supplied from the emission circulation gas supply line 25 is introduced into the emission circulation gas flow path R and the scoop 7. In the combustor 22 of the present embodiment, the emission circulation gas E is introduced from the scoop 7 to the center portion of the combustion cylinder 4, and flows to the front and rear (upstream side Da1 and downstream side Da2) in the flow direction of the combustion gas.

As illustrated in FIG. 3, the main nozzle 6 of the present embodiment has a first ring 8 that is an annular member provided radially outside the pilot nozzle 5, and a second ring 9 that is an annular member provided radially outside the first ring 8. An inner peripheral side space 34*a* into which the emission circulation gas E that is an inert gas is introduced is defined between the pilot nozzle 5 and the first ring 8 radially inside the main nozzle 6.

An outer peripheral side space 34*b* into which the emission circulation gas E that is an inert gas is introduced is defined between the second ring 9 and the inner cylinder 2 radially outside the main nozzle 6.

That is, a part of the emission circulation gas E supplied from the emission circulation gas supply line 25 is supplied to the combustion cylinder 4 after being introduced an inner peripheral side space 34*a* radially inside the main nozzle 6 and an outer peripheral side space 34*b* radially outside the main nozzle 6.

A swirler 36 (swirl vane) is provided in the inner peripheral side space 34*a* and the outer peripheral side space 34*b*. The swirler 36 applies a swirling force to flows in the inner peripheral side space 34*a* and the outer peripheral side space 34*b*.

The radial width of the inner peripheral side space 34*a* in the present embodiment is larger than the radial width of the outer peripheral side space 34*b*.

The main nozzle 6 has a fuel injection nozzle unit 35 that is provided between the first ring 8 and the second ring 9 and injects the gas fuel F. A plurality of fuel injection holes 35*a* are formed at a tip portion of the fuel injection nozzle unit 35. That is, a part of the gas fuel F supplied from the gas fuel supply line 26 is introduced into the fuel injection nozzle unit 35. The fuel injection nozzle unit 35 functions as a fuel supply unit that supplies the gas fuel F into the combustion cylinder 4.

Figure 4:
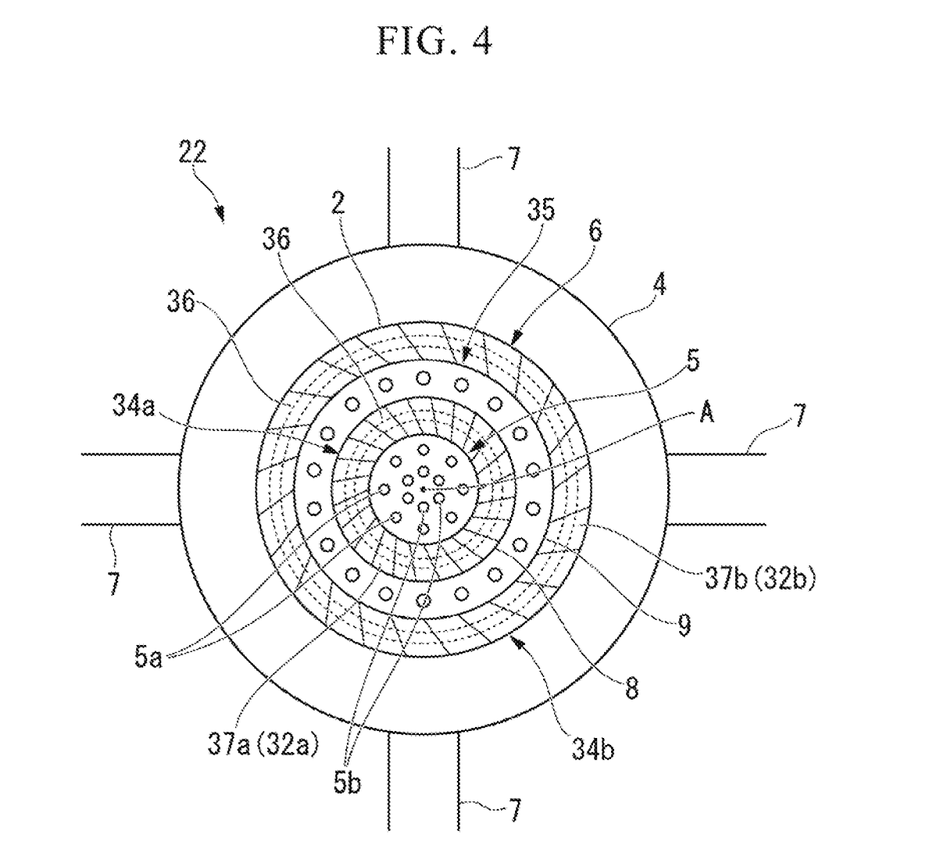
FIG. 4 is a cross-sectional view taken along line IV-IV in FIG. 3, illustrating the combustor as viewed from the downstream side.

A plurality of fuel injection holes 5*a* and a plurality of oxygen injection holes 5*b* are formed at a tip portion of the pilot nozzle 5. As illustrated in FIG. 4, the plurality of fuel injection holes 5*a* are formed at intervals in the circumferential direction centered on the axis A. The plurality of oxygen injection holes 5*b* are formed at intervals in the circumferential direction radially inside the plurality of fuel injection holes 5*a*.

The inner peripheral side oxygen supply unit 32*a* has an inner peripheral side nozzle 37*a* that extends from the downstream side Da2 toward the upstream side Da1 between the main nozzle 6 and the pilot nozzle 5 (a radial gap). The inner peripheral side nozzle 37*a* is a tubular nozzle that is disposed in the inner peripheral side space 34*a* between the main nozzle 6 and the pilot nozzle 5.

The inner peripheral side nozzle 37*a* is connected to the first oxygen supply line 27*a*. A plurality of inner peripheral oxygen injection holes 40*a* are formed at a tip portion of the inner peripheral side nozzle 37*a*. The inner peripheral oxygen injection holes 40*a* (the tip of the inner peripheral side nozzle 37*a*) are disposed on the upstream side Da1 of the swirler 36.

The outer peripheral side oxygen supply unit 32*b* has an outer peripheral side nozzle 37*b* that extends from the downstream side Da2 toward the upstream side Da1 between the main nozzle 6 and the inner cylinder 2 (a radial gap). The outer peripheral side nozzle 37*b* is a tubular nozzle that is disposed in the outer peripheral side space 34*b* between the main nozzle 6 and the inner cylinder 2.

The outer peripheral side nozzle 37*b* is connected to the second oxygen supply line 27*b*. A plurality of outer peripheral oxygen injection holes 40*b* are formed at a tip portion of the outer peripheral side nozzle 37*b*. The outer peripheral oxygen injection holes 40*b* (the tip of the outer peripheral side nozzle 37*b*) are disposed on the upstream side Da1 of the swirler 36.

The scoop oxygen supply unit 32*c* has a scoop nozzle 38 that extends along a central axis of the scoop 7 on the inner peripheral side with respect to the scoop 7. Similarly to the scoop 7, the scoop nozzle 38 is formed so as to penetrate the combustion cylinder 4. An oxygen injection hole 40*c* is formed at a tip of the scoop nozzle 38. Oxygen injected from the oxygen injection hole 40*c* of the scoop nozzle 38 is introduced into the center portion of the combustion cylinder 4 together with the emission circulation gas E introduced via the scoop 7.

The pilot nozzle 5 functions as the oxygen supply unit 32. That is, the oxygen supplied to the pilot nozzle 5 via the fourth oxygen supply line 27*d* is injected from an oxygen injection hole 5*b* formed at the tip portion of the pilot nozzle 5. The oxygen introduced into the pilot nozzle 5 via the fourth oxygen supply line 27*d* is supplied from the radial center on the upstream side Da1 of the combustion cylinder 4 toward the downstream side Da2.

The CO concentration measurement device 10 is a device that measures the CO concentration (carbon monoxide concentration) of the combustion gas flowing through the combustion cylinder 4. The CO concentration measurement device 10 is attached to an inner peripheral surface of the combustion cylinder 4. The CO concentration measurement device 10 has a plurality of measurement points 10a that are spaced apart in the radial direction. The measurement points 10a are disposed at least near a radial center portion of the combustion cylinder 4 and radially outside the combustion cylinder 4 (near the inner peripheral surface of the combustion cylinder 4). The CO concentration measurement device 10 is electrically connected to the analysis unit 19.

The analysis unit 19 analyzes the CO concentration of the combustion gas measured by the CO concentration measurement device 10. The analysis unit 19 can calculate, for example, a difference D between the CO concentration at the central portion of the combustion cylinder 4 and the CO concentration on the radially outer side.

The analysis unit 19 and the adjustment unit 20 are electrically connected to each other. Additionally, the adjustment unit 20 and the first adjustment valve 42a are electrically connected to each other, and the adjustment unit 20 and the second adjustment valve 42b are electrically connected to each other.

The adjustment unit 20 has a function of adjusting the opening degrees of the first adjustment valve 42a and the second adjustment valve 42b on the basis of the difference D between the CO concentration at the central portion of the combustion cylinder 4 and the CO concentration on the radially outer side that is calculated by the analysis unit 19. That is, the adjustment unit 20 has a function of adjusting the relative amounts of the oxygen supplied by the inner peripheral side oxygen supply unit 32a and the oxygen supplied by the outer peripheral side oxygen supply unit 32b.

The adjustment unit 20 determines whether or not the difference D is within a predetermined value, and adjusts the opening degrees of the first adjustment valve 42a and the second adjustment valve 42b in a case where the difference D is not within the predetermined value.

Specifically, in a case where the difference D is not within the predetermined value and the CO concentration at the central portion is higher than the CO concentration on the radially outer side, the adjustment unit 20 adjusts the opening degrees of the first adjustment valve 42a and the second adjustment valve 42b so as to increase the supply amount of the oxygen by the inner peripheral side oxygen supply unit 32a and decrease the supply amount of the oxygen by the outer peripheral side oxygen supply unit 32b. Additionally, in a case where the CO concentration at the central portion is lower than the CO concentration on the radially outer side, the adjustment unit 20 adjusts the opening degrees of the first adjustment valve 42a and the second adjustment valve 42b so as to decrease the supply amount of the oxygen by the inner peripheral side oxygen supply unit 32a and increase the supply amount of the oxygen by the outer peripheral side oxygen supply unit 32b.

Next, a method of controlling the combustor 22 will be described.

Figure 5:
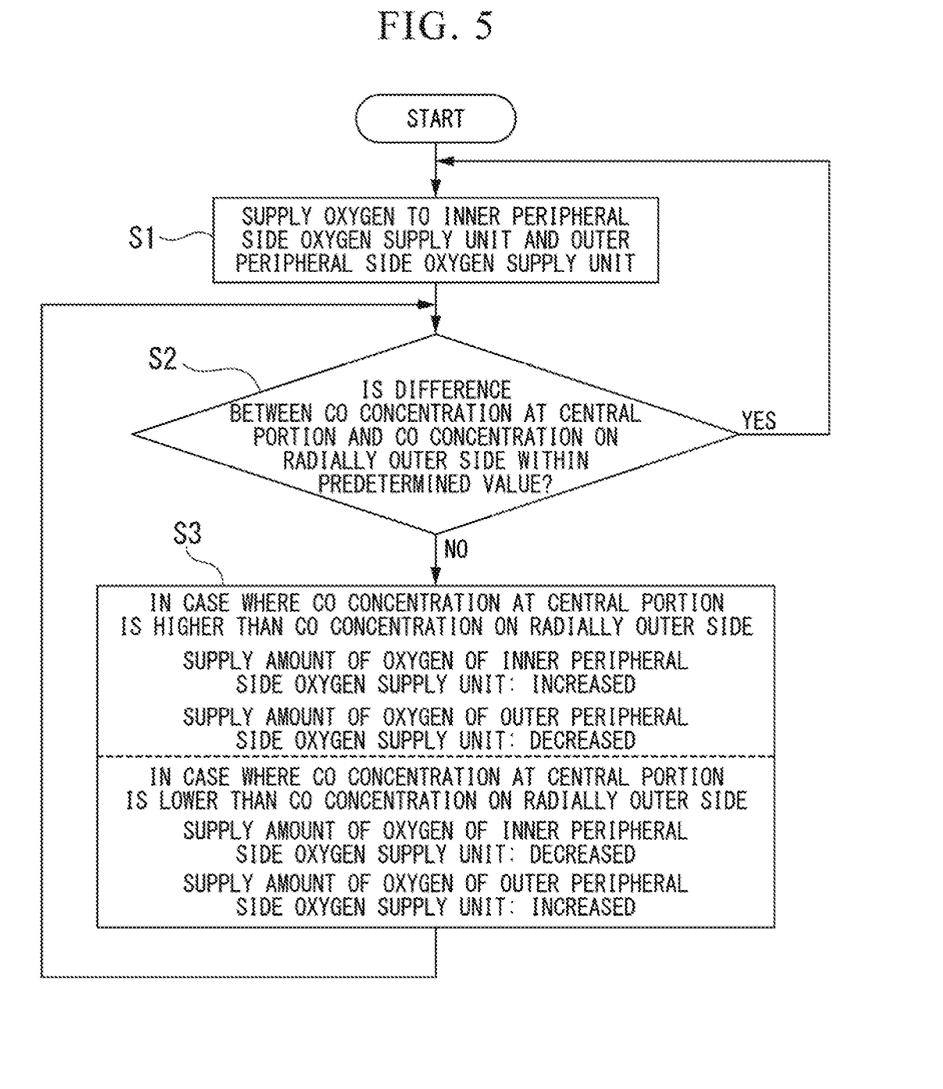
FIG. 5 is a flowchart illustrating a method of controlling the combustor according to the first embodiment of the present invention.

As illustrated in FIG. 5, the method of controlling the combustor includes an oxygen supply step S1, a concentration difference determination step S2, and an oxygen supply amount change step S3. In the oxygen supply step S1, oxygen is supplied from the inner peripheral side oxygen supply unit 32a and the outer peripheral side oxygen supply unit 32b. In the concentration difference determination step S2, it is determined whether or not the difference D between the CO concentration at the central portion of the combustion cylinder 4 and the CO concentration on the radially outer side is within a predetermined value. In the oxygen supply amount change step S3, the supply amount of the oxygen is changed in a case where the difference D is not within the predetermined value.

In the oxygen supply step S1, oxygen is supplied from the inner peripheral side oxygen supply unit 32a and the outer peripheral side oxygen supply unit 32b. For example, the supply amount of the oxygen supplied from the inner peripheral side oxygen supply unit 32a and the supply amount of the oxygen supplied from the outer peripheral side oxygen supply unit 32b can be made equal to each other.

In the concentration difference determination step S2, in a case where the difference D between the CO concentration at the central portion of the combustion cylinder 4 and the CO concentration on the radially outer side is within a predetermined value, oxygen supply is continued. On the other hand, in a case where the difference D is not within the predetermined value, the oxygen supply amount change step S3 is executed.

In the oxygen supply amount change step S3, in a case where the CO concentration at the central portion is higher than the CO concentration on the radially outer side, the opening degrees of the first adjustment valve 42a and the second adjustment valve 42b are adjusted so as to increase the supply amount of the oxygen of the inner peripheral side oxygen supply unit 32a and decrease the oxygen supply of the outer peripheral side oxygen supply unit 32b. Additionally, in a case where the CO concentration at the central portion is lower than the CO concentration on the radially outer side, the opening degrees of the first adjustment valve 42a and the second adjustment valve 42b are adjusted so as to decrease the supply amount of the oxygen of the inner peripheral side oxygen supply unit 32a and increase the supply amount of the oxygen of the outer peripheral side oxygen supply unit 32b.

This control can make the CO concentration within the combustion cylinder 4 uniform.

In the combustor 22 of the present embodiment, the gas fuel F and oxygen are injected from the main nozzle 6. The emission circulation gas E and oxygen are injected from the inner peripheral side space 34a and the outer peripheral side space 34b. The gas fuel F and oxygen are injected from the pilot nozzle 5. The emission circulation gas E and oxygen are injected from the scoop 7 toward the center portion.

For that reason, the gas fuel F and oxygen are mixed with each other and ignited in a space sandwiched by the emission circulation gas E. As a result, sufficient mixing is possible, a flame sheet FL (refer to FIG. 2) is formed at an appropriate position, and combustion is efficiently performed.

The gas fuel F injected from the fuel injection nozzle unit 35 of the main nozzle 6 is supplied to the radially outer side outside with respect to the emission circulation gas E supplied from the scoop 7.

Additionally, the oxygen injected from the nozzles 37a and 37b is introduced into the main nozzle 6 and then mixed with the emission circulation gas E in the inner peripheral side space 34a and the outer peripheral side space 34b. This air-fuel mixture is supplied via the scoop 7 to the radially outer side with respect to the emission circulation gas E supplied to the center portion of the combustion cylinder 4.

According to the combustor 22 of the present embodiment, the relative amounts of the oxygen supplied to the inner peripheral side space 34a and the oxygen supplied to the outer peripheral side space 34b are adjusted. For that reason, it is possible to bring the oxygen concentration closer to a more suitable oxygen concentration in accordance with the combustion state of the fuel. Accordingly, the CO concentration of the combustion gas can be reduced.

Additionally, the adjustment unit 20 individually adjusts the supply amount of the oxygen supplied from the inner peripheral side oxygen supply unit 32a and the supply amount of the oxygen supplied from the outer peripheral side oxygen supply unit 32b. Accordingly, the optimal oxygen concentration can be set according to the combustion state of the fuel.

Additionally, the gas fuel F and oxygen are adjacently supplied to the outside with respect to the emission circulation gas E (inert gas) supplied to the center portion within the combustion cylinder 4. For that reason, the mixing of the gas fuel F and oxygen becomes excellent. Accordingly, the utilization rate of oxygen by combustion can be brought close to 100%. Therefore, it is possible to suppress the remaining of oxygen in the emission circulation gas E and improve the combustion efficiency.

In addition to the above oxygen, oxygen is supplied from the scoop 7 via the scoop nozzle 38, and oxygen is supplied in two steps. Accordingly, the combustion gas temperature and the radiation intensity can be reduced. Moreover, even in a case where the gas fuel F contains a nitrogen component, the generation of NOx can be suppressed.

Additionally, by providing the pilot nozzle 5 as the oxygen supply unit 32 that supplies oxygen from the radial center on the upstream side Da1 of the combustion cylinder 4 toward the downstream side Da2, the oxygen is supplied in three steps. Accordingly, the combustion gas temperature and the radiation intensity can be further reduced.

Additionally, oxygen is supplied from the tip of the pilot nozzle 5. Accordingly, the flame holding property when starting the gas turbine 14 can be improved.

Additionally, the emission circulation gas E, which is an inert gas, contains carbon dioxide. By circulating the emission circulation gas E, it is possible to suppress the discharge amount of carbon dioxide.

In addition, the above embodiment is configured such that the supply amount of the oxygen supplied from the inner peripheral side oxygen supply unit 32a and the supply amount of the oxygen supplied from the outer peripheral side oxygen supply unit 32b are individually adjusted, but the present invention is not limited to this. For example, the second adjustment valve 42b may be eliminated and the relative amounts of the oxygen supplied to the inner peripheral side space 34a and the oxygen supplied to the outer peripheral side space 34b may be adjusted using only the first adjustment valve 42a.

Second Embodiment

Hereinafter, a combustor according to a second embodiment of the present invention will be described in detail with reference to the drawings. In addition, in the present embodiment, differences from the above-described first embodiment will be mainly described, and a description of similar portions will be omitted.

Figure 6:
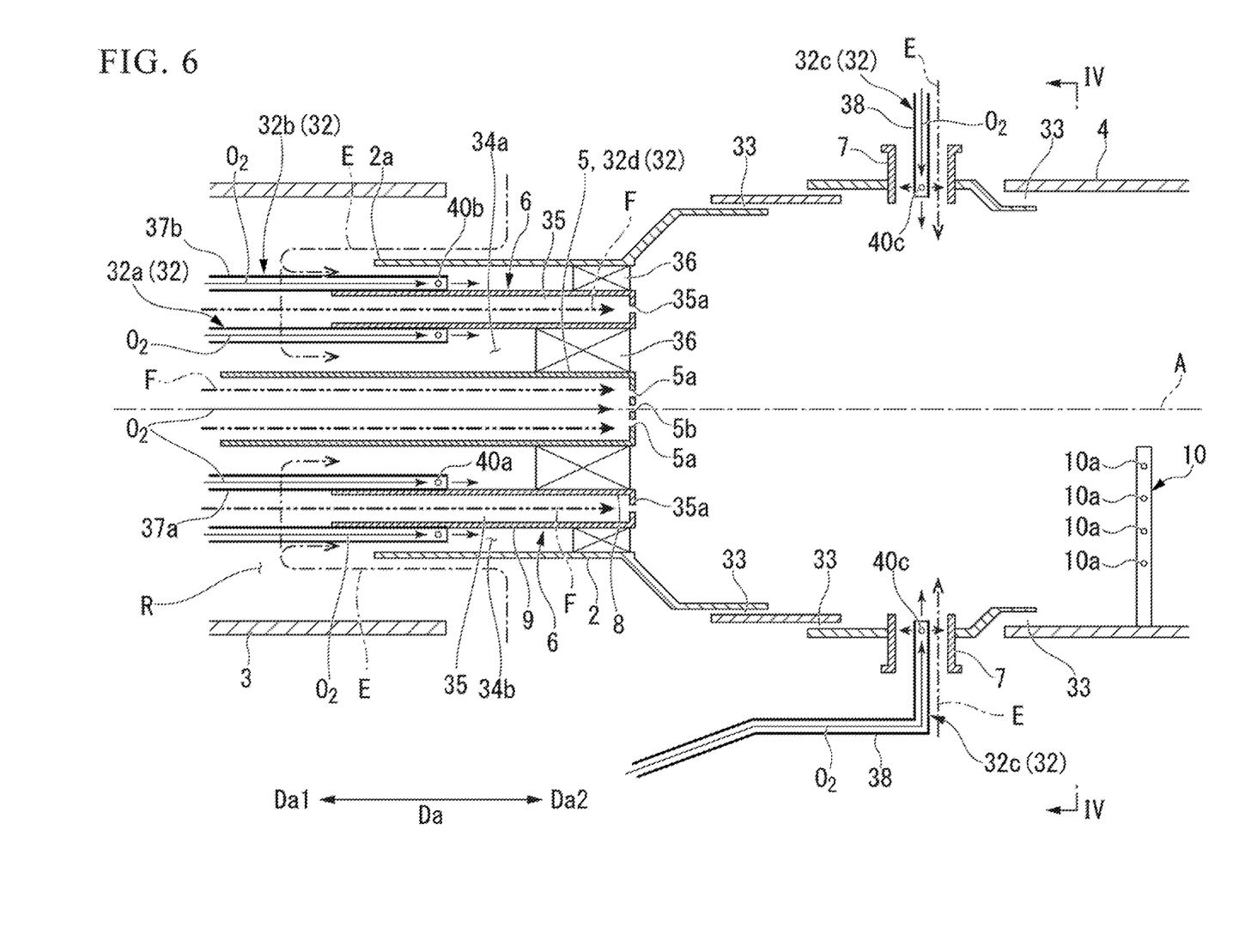
FIG. 6 is a detailed view of a combustor of a second embodiment of the present invention.

As illustrated in FIG. 6, the inner peripheral side nozzle 37a (inner peripheral oxygen injection holes 40a) of the present embodiment is installed at a position biased toward the main nozzle 6 side in the radial direction. In other words, the inner peripheral side nozzle 37a of the present embodiment is disposed as close to the radially outer side as possible.

The outer peripheral side nozzle 37b (outer peripheral oxygen injection hole 40b) of the present embodiment is installed at a position biased to the main nozzle 6 side. In other words, the outer peripheral side nozzle 37b of the present embodiment is disposed as close to the radially inner side as possible.

According to the above embodiment, the oxygen concentration on the side of the main nozzle 6, which is the fuel supply unit, becomes higher. For that reason, the combustion of fuel is promoted, and the CO concentration of the combustion gas can be further reduced.

Third Embodiment

Hereinafter, a combustor according to a third embodiment of the present invention will be described in detail with reference to the drawings. In addition, in the present embodiment, differences from the above-described second embodiment will be mainly described, and a description of similar portions will be omitted.

Figure 7:
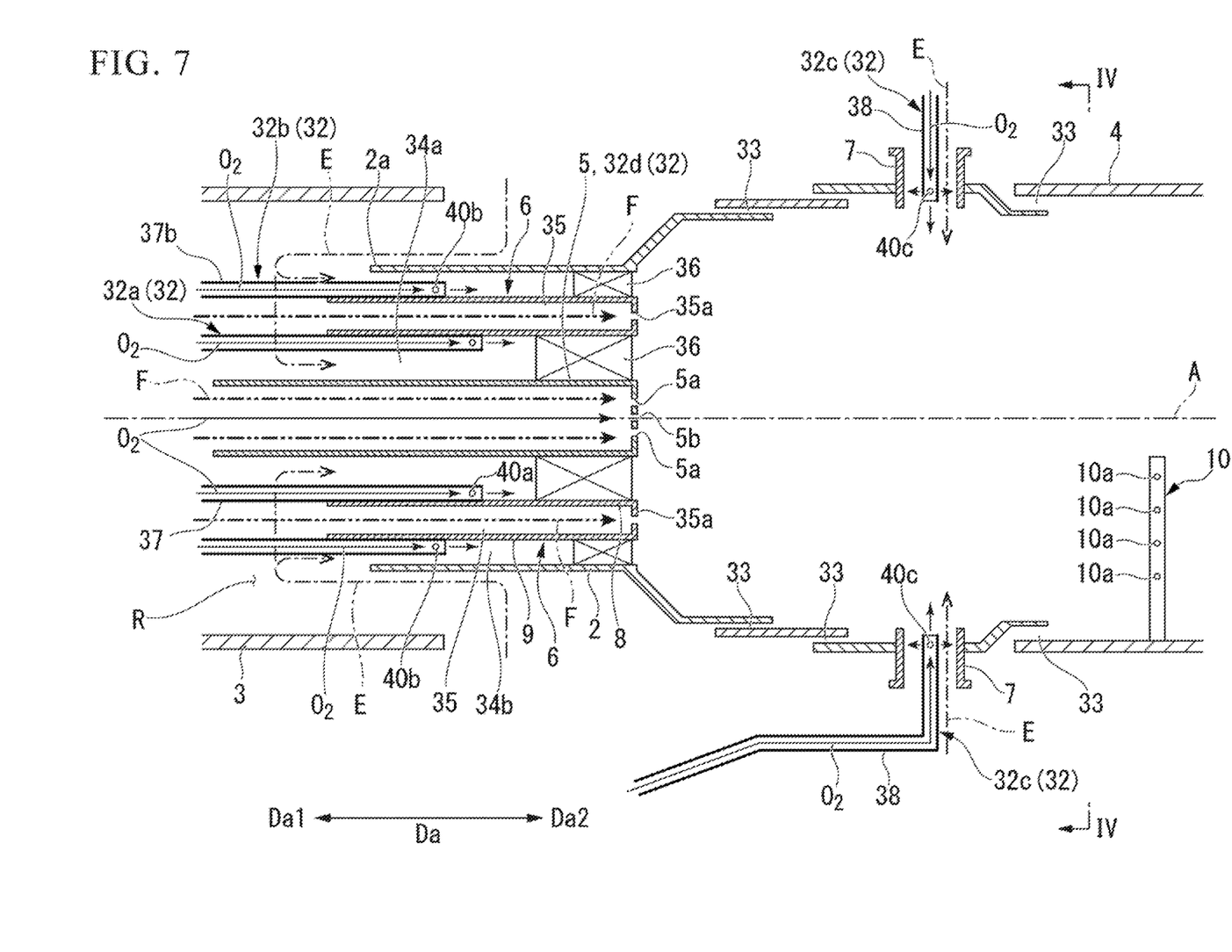
FIG. 7 is a detailed view of a combustor according to a third embodiment of the present invention.

As illustrated in FIG. 7, the positions of the inner peripheral oxygen injection holes 40a in the axial direction and the positions of the outer peripheral oxygen injection holes 40b in the axial direction in the present embodiment are different from each other. Specifically, the positions of the inner peripheral oxygen injection holes 40a in the axial direction are disposed on the downstream side Da2 of the positions of the outer peripheral oxygen injection holes 40b in the axial direction.

According to the above embodiment, the combustibility of the gas fuel F and oxygen is activated on the inner peripheral side to improve the flame holding property, and the flame temperature is suppressed on the outer peripheral side. For that reason, a temperature rise on the wall surface side of the combustion cylinder 4 can be suppressed.

In addition, in the above embodiment, although the positions of the inner peripheral oxygen injection holes 40a in the axial direction disposed on the downstream side Da2 of the position of the outer peripheral oxygen injection hole 40b in the axial direction, the invention is not limited to this. For example, the positions of the inner peripheral oxygen injection holes 40a in the axial direction may be disposed on the upstream side Da1 of the positions of the outer peripheral oxygen injection holes 40b in the axial direction.

In this way, by optionally changing the mixing distance between the emission circulation gas and oxygen, the oxygen mixing at a nozzle outlet can have a distribution. The CO concentration can be reduced by intentionally giving a distribution in accordance with the combustion state in the downstream. Depending on the gas composition and the combustion state, it may be better to have a distribution of $O_2$.

Although the embodiments of the present invention have been described above in detail with reference to the drawings, the specific configuration is not limited to the present embodiments, and also includes design changes and the like without departing from the scope of the present invention.

In addition, the combustor 22 of the present embodiment has the pilot nozzle 5, but it is not always necessary to provide the pilot nozzle.

INDUSTRIAL APPLICABILITY

According to the present invention, by adjusting the relative amounts of the oxygen supplied to the inner peripheral side space and the oxygen supplied to the outer peripheral side space, it is possible to bring the oxygen concentration closer to a more suitable oxygen concentration in accordance with the combustion state of the fuel. Accordingly, the CO concentration of the combustion gas can be reduced.

REFERENCE SIGNS LIST

1 Power generation system
2 Inner cylinder

3 Outer cylinder
4 Combustion cylinder
5 Pilot nozzle
5a, 5b Fuel injection hole 5a
6 Main nozzle
7 Scoop
8 First ring
9 Second ring
10 CO concentration measurement device
10a Measurement point
11 Gasification furnace
12 Gas purification apparatus
13 Oxygen production apparatus
14 Gas turbine
15 First generator
16 Waste heat recovery boiler
17 Steam turbine
18 Second generator
19 Analysis unit
20 Adjustment unit
21 Compressor
22 Combustor
23 Turbine
24 Turbine shaft
25 Emission circulation gas supply line
26 Gas fuel supply line
27 Oxygen supply line
27a First oxygen supply line
27b Second oxygen supply line
27c Third oxygen supply line
27d Fourth oxygen supply line
28 Combustion gas supply line
29 Emission gas discharge line
30 Emission gas return line
31 Emission gas recovery line
32 Oxygen supply unit
32a Inner peripheral side oxygen supply unit
32b Outer peripheral side oxygen supply unit
32c Scoop oxygen supply unit
32d Pilot nozzle oxygen supply unit
33 Opening
34a Inner peripheral side space
34b Outer peripheral side space
35 Fuel injection nozzle unit (fuel supply unit)
35a Fuel injection hole
36 Swirler
37a Inner peripheral side nozzle
37b Outer peripheral side nozzle
38 Scoop nozzle
40 Oxygen injection hole
40a Inner peripheral oxygen injection hole
40b Outer peripheral oxygen injection hole
40c Oxygen injection hole
42 Adjustment valve
42a First adjustment valve
42b Second adjustment valve
42c Third adjustment valve
42d Fourth adjustment valve
A Axis
E Emission circulation gas (inert gas)
F Gas fuel
FL Flame sheet
Da Axial direction

What is claimed is:

1. A combustor comprising:
a combustion cylinder having a tubular shape centered on an axis;
a fuel supply unit that has a tubular shape centered on the axis and is configured to inject fuel from an upstream side with respect to the combustion cylinder,
the fuel supply unit defining an inner peripheral side space into which an inert gas is introduced on a radially inner side around the axis and which is configured to supply the inert gas to the combustion cylinder and defining an outer peripheral side space into which the inert gas is introduced on a radially outer side around the axis and which is configured to supply the inert gas to the combustion cylinder;
an inner peripheral side oxygen supply unit that is configured to supply oxygen to the inner peripheral side space;
an outer peripheral side oxygen supply unit that is configured to supply oxygen to the outer peripheral side space; and
an adjustment unit that is configured to adjust relative amounts of the oxygen supplied by the inner peripheral side oxygen supply unit and the oxygen supplied by the outer peripheral side oxygen supply unit,
wherein the inner peripheral side oxygen supply unit has a tubular inner peripheral side nozzle that extends in an axial direction, and a plurality of inner peripheral oxygen injection holes disposed at a tip of the inner peripheral side nozzle, and the plurality of inner peripheral oxygen injection holes are disposed as close to the radially outer side as possible, and
wherein the outer peripheral side oxygen supply unit has a tubular outer peripheral side nozzle that extends in the axial direction, and a plurality of outer peripheral oxygen injection holes disposed at a tip of the outer peripheral side nozzle, and the plurality of outer peripheral oxygen injection holes are disposed as close to the radially inner side as possible.

2. The combustor according to claim 1,
wherein the adjustment unit is configured to individually adjust a supply amount of the oxygen supplied from the inner peripheral side oxygen supply unit and a supply amount of the oxygen supplied from the outer peripheral side oxygen supply unit.

3. A combustor comprising:
a combustion cylinder having a tubular shape centered on an axis;
a fuel supply unit that has a tubular shape centered on the axis and is configured to inject fuel from an upstream side with respect to the combustion cylinder,
the fuel supply unit defining an inner peripheral side space into which an inert gas is introduced on a radially inner side around the axis and which is configured to supply the inert gas to the combustion cylinder and defining an outer peripheral side space into which the inert gas is introduced on a radially outer side around the axis and which is configured to supply the inert gas to the combustion cylinder;
an inner peripheral side oxygen supply unit that is configured to supply oxygen to the inner peripheral side space;
an outer peripheral side oxygen supply unit that is configured to supply oxygen to the outer peripheral side space; and
an adjustment unit that is configured to adjust relative amounts of the oxygen supplied by the inner peripheral side oxygen supply unit and the oxygen supplied by the outer peripheral side oxygen supply unit,
wherein the inner peripheral side oxygen supply unit has a tubular inner peripheral side nozzle that extends in an axial direction, and a plurality of inner peripheral oxygen injection holes disposed at a tip of the inner peripheral side nozzle, wherein the outer peripheral side oxygen supply unit has a tubular outer peripheral side nozzle that extends in the axial direction, and a plurality of outer peripheral oxygen injection holes disposed at a tip of the outer peripheral side nozzle, and wherein positions of the plurality of inner peripheral oxygen injection holes in the axial direction are different from positions of the plurality of outer peripheral oxygen injection holes in the axial direction.

4. The combustor according to claim 3, wherein the positions of the plurality of inner peripheral oxygen injection holes in the axial direction are disposed downstream with respect to the positions of the plurality of outer peripheral oxygen injection holes in the axial direction.

5. A combustor comprising:

a combustion cylinder having a tubular shape centered on an axis;

a fuel supply unit that has a tubular shape centered on the axis and is configured to inject fuel from an upstream side with respect to the combustion cylinder, the fuel supply unit defining an inner peripheral side space into which an inert gas is introduced on a radially inner side around the axis and which is configured to supply the inert gas to the combustion cylinder and defining an outer peripheral side space into which the inert gas is introduced on a radially outer side around the axis and which is configured to supply the inert gas to the combustion cylinder;

an inner peripheral side oxygen supply unit that is configured to supply oxygen to the inner peripheral side space;

an outer peripheral side oxygen supply unit that is configured to supply oxygen to the outer peripheral side space;

an adjustment unit that is configured to adjust relative amounts of the oxygen supplied by the inner peripheral side oxygen supply unit and the oxygen supplied by the outer peripheral side oxygen supply unit; and a CO concentration measurement device that is configured to measure a CO concentration of a combustion gas flowing in the combustion cylinder, wherein the adjustment unit increases a supply amount of the oxygen by the inner peripheral side oxygen supply unit and decreases a supply amount of the oxygen by the outer peripheral side oxygen supply unit in a case where a CO concentration at a central portion in the combustion cylinder is higher than a CO concentration on the radially outer side in the combustion cylinder, and decreases the supply amount of the oxygen by the inner peripheral side oxygen supply unit and increases the supply amount of the oxygen by the outer peripheral side oxygen supply unit in a case where the CO concentration at the central portion in the combustion cylinder is lower than the CO concentration on the radially outer side in the combustion cylinder.

* * * * *